United States Patent
Brennan et al.

(10) Patent No.: US 9,719,439 B2
(45) Date of Patent: Aug. 1, 2017

(54) SYSTEM AND METHOD FOR CONTROLLING SPARK TIMING WHEN CYLINDERS OF AN ENGINE ARE DEACTIVATED TO REDUCE NOISE AND VIBRATION

(71) Applicant: GM Global Technology Operations LLC, Detroit, MI (US)

(72) Inventors: Daniel G. Brennan, Brighton, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 13/798,590

(22) Filed: Mar. 13, 2013

(65) Prior Publication Data

US 2014/0053805 A1 Feb. 27, 2014

Related U.S. Application Data

(60) Provisional application No. 61/693,039, filed on Aug. 24, 2012.

(51) Int. Cl.
 *F02D 41/00* (2006.01)
 *F02D 17/00* (2006.01)
 (Continued)

(52) U.S. Cl.
 CPC ......... *F02D 41/0087* (2013.01); *F02D 17/00* (2013.01); *F02D 37/02* (2013.01);
 (Continued)

(58) Field of Classification Search
 CPC . Y02T 10/46; F02D 13/06; F02D 2041/0012; F02D 41/0082; F02D 41/008; F02D 37/02; F02D 41/021; F02D 41/1498; F02D 41/3058; F02D 17/00; F02D 17/02; F02D 2041/1432; F02D 2200/025;
 (Continued)

(56) References Cited

U.S. PATENT DOCUMENTS 3,596,640 A 8/1971 Bloomfield
4,129,034 A 12/1978 Niles et al.
(Continued)

FOREIGN PATENT DOCUMENTS

CN 1573916 A 2/2005
CN 1888407 A 1/2007
(Continued)

OTHER PUBLICATIONS

U.S. Appl. No. 13/798,384, filed Mar. 13, 2013, Burtch.
(Continued)

*Primary Examiner* — Hung Q Nguyen
*Assistant Examiner* — John Bailey

(57) ABSTRACT

A system according to the principles of the present disclosure includes a cylinder activation module and a spark timing module. The cylinder activation module selectively deactivates and reactivates a cylinder of an engine based on a driver torque request. When the cylinder is deactivated, the spark timing module selectively increases an amount by which spark timing of at least one active cylinder of the engine is retarded based on noise and vibration generated by the engine when the cylinder is deactivated.

20 Claims, 6 Drawing Sheets

(51) Int. Cl.
*F02D 37/02* (2006.01)
*F02P 5/15* (2006.01)

(52) U.S. Cl.
CPC ...... *F02P 5/1512* (2013.01); *F02D 2200/025* (2013.01); *F02D 2250/18* (2013.01); *Y02T 10/46* (2013.01)

(58) Field of Classification Search
CPC ............ F02D 2250/28; F01L 2013/001; F02N 99/004; F02P 5/1512
USPC ......... 123/350, 329, 339.11, 406.11, 406.14, 123/406.19, 406.44, 406.57, 406.72, 123/406.76, 596, 620, 627, 636, 637, 638, 123/639, 645, 146.5 R, 179.5, 406, 406.2, 123/406.21, 406.41, 435, 673, 691, 692, 123/481, 643, 198 DC, 198 F
See application file for complete search history.

(56) References Cited

U.S. PATENT DOCUMENTS

| | | | |
|---|---|---|---|
| 4,172,434 A | 10/1979 | Coles | |
| 4,377,997 A * | 3/1983 | Staerzl | F02P 1/086 123/406.29 |
| 4,434,767 A | 3/1984 | Kohama et al. | |
| 4,489,695 A | 12/1984 | Kohama et al. | |
| 4,509,488 A | 4/1985 | Forster et al. | |
| 4,535,744 A | 8/1985 | Matsumura | |
| 4,770,148 A | 9/1988 | Hibino et al. | |
| 4,887,216 A | 12/1989 | Ohnari et al. | |
| 4,974,563 A | 12/1990 | Ikeda et al. | |
| 4,987,888 A | 1/1991 | Funabashi et al. | |
| 5,042,444 A | 8/1991 | Hayes et al. | |
| 5,094,213 A | 3/1992 | Dudek et al. | |
| 5,226,513 A | 7/1993 | Shibayama | |
| 5,278,760 A | 1/1994 | Ribbens et al. | |
| 5,357,932 A | 10/1994 | Clinton et al. | |
| 5,374,224 A | 12/1994 | Huffmaster et al. | |
| 5,377,631 A | 1/1995 | Schechter | |
| 5,423,208 A | 6/1995 | Dudek et al. | |
| 5,465,617 A | 11/1995 | Dudek et al. | |
| 5,496,227 A | 3/1996 | Minowa et al. | |
| 5,540,633 A | 7/1996 | Yamanaka et al. | |
| 5,553,575 A | 9/1996 | Beck et al. | |
| 5,584,266 A | 12/1996 | Motose et al. | |
| 5,669,354 A | 9/1997 | Morris | |
| 5,692,471 A | 12/1997 | Zhang | |
| 5,720,257 A | 2/1998 | Motose et al. | |
| 5,778,858 A | 7/1998 | Garabedian | |
| 5,813,383 A | 9/1998 | Cummings | |
| 5,884,605 A * | 3/1999 | Nagaishi | F02P 5/1521 123/339.11 |
| 5,909,720 A | 6/1999 | Yamaoka et al. | |
| 5,931,140 A | 8/1999 | Maloney | |
| 5,934,263 A | 8/1999 | Russ et al. | |
| 5,941,927 A | 8/1999 | Pfitz | |
| 5,974,870 A | 11/1999 | Treinies et al. | |
| 5,975,052 A | 11/1999 | Moyer | |
| 5,983,867 A | 11/1999 | Stuber et al. | |
| 6,125,812 A | 10/2000 | Garabedian | |
| 6,158,411 A | 12/2000 | Morikawa | |
| 6,244,242 B1 | 6/2001 | Grizzle et al. | |
| 6,247,449 B1 | 6/2001 | Persson | |
| 6,272,427 B1 | 8/2001 | Wild et al. | |
| 6,286,366 B1 | 9/2001 | Chen et al. | |
| 6,295,500 B1 * | 9/2001 | Cullen | B60K 6/48 180/170 |
| 6,332,446 B1 * | 12/2001 | Matsumoto | F01L 9/04 123/198 F |
| 6,334,425 B1 | 1/2002 | Nagatani et al. | |
| 6,355,986 B1 | 3/2002 | Kato et al. | |
| 6,360,724 B1 | 3/2002 | Suhre et al. | |
| 6,363,316 B1 | 3/2002 | Soliman et al. | |
| 6,371,075 B2 | 4/2002 | Koch | |
| 6,385,521 B1 | 5/2002 | Ito | |
| 6,408,625 B1 | 6/2002 | Woon et al. | |
| 6,520,140 B2 | 2/2003 | Dreymuller et al. | |
| 6,546,912 B2 | 4/2003 | Tuken | |
| 6,588,261 B1 | 7/2003 | Wild et al. | |
| 6,619,258 B2 | 9/2003 | McKay et al. | |
| 6,622,548 B1 | 9/2003 | Hernandez | |
| 6,694,806 B2 | 2/2004 | Kumagai et al. | |
| 6,738,707 B2 | 5/2004 | Kotwicki et al. | |
| 6,754,577 B2 | 6/2004 | Gross et al. | |
| 6,760,656 B2 | 7/2004 | Matthews et al. | |
| 6,850,831 B2 | 2/2005 | Buckland et al. | |
| 6,909,961 B2 | 6/2005 | Wild et al. | |
| 6,978,204 B2 | 12/2005 | Surnilla et al. | |
| 6,980,902 B2 | 12/2005 | Nakazawa | |
| 6,981,492 B2 | 1/2006 | Barba et al. | |
| 6,983,737 B2 | 1/2006 | Gross et al. | |
| 7,003,390 B2 | 2/2006 | Kaga | |
| 7,024,301 B1 | 4/2006 | Kar et al. | |
| 7,025,041 B2 | 4/2006 | Abe et al. | |
| 7,028,661 B1 | 4/2006 | Bonne et al. | |
| 7,032,545 B2 | 4/2006 | Lewis et al. | |
| 7,032,581 B2 | 4/2006 | Gibson et al. | |
| 7,044,101 B1 | 5/2006 | Duty et al. | |
| 7,063,062 B2 | 6/2006 | Lewis et al. | |
| 7,066,121 B2 | 6/2006 | Michelini et al. | |
| 7,066,136 B2 | 6/2006 | Ogiso | |
| 7,069,718 B2 | 7/2006 | Surnilla et al. | |
| 7,069,773 B2 | 7/2006 | Stempnik et al. | |
| 7,086,386 B2 | 8/2006 | Doering | |
| 7,100,720 B2 | 9/2006 | Ishikawa | |
| 7,111,612 B2 | 9/2006 | Michelini et al. | |
| 7,140,355 B2 * | 11/2006 | Michelini | F02D 13/06 123/192.1 |
| 7,159,568 B1 | 1/2007 | Lewis et al. | |
| 7,174,713 B2 | 2/2007 | Nitzke et al. | |
| 7,174,879 B1 | 2/2007 | Chol et al. | |
| 7,200,486 B2 | 4/2007 | Tanaka et al. | |
| 7,203,588 B2 | 4/2007 | Kaneko et al. | |
| 7,231,907 B2 | 6/2007 | Bolander et al. | |
| 7,278,391 B1 | 10/2007 | Wong et al. | |
| 7,292,231 B2 | 11/2007 | Kodama et al. | |
| 7,292,931 B2 | 11/2007 | Davis et al. | |
| 7,319,929 B1 | 1/2008 | Davis et al. | |
| 7,363,111 B2 | 4/2008 | Vian et al. | |
| 7,367,318 B2 | 5/2008 | Moriya et al. | |
| 7,415,345 B2 | 8/2008 | Wild | |
| 7,440,838 B2 | 10/2008 | Livshiz et al. | |
| 7,464,676 B2 | 12/2008 | Wiggins et al. | |
| 7,472,014 B1 | 12/2008 | Albertson et al. | |
| 7,497,074 B2 | 3/2009 | Surnilla et al. | |
| 7,499,791 B2 | 3/2009 | You et al. | |
| 7,503,312 B2 | 3/2009 | Surnilla et al. | |
| 7,509,201 B2 | 3/2009 | Bolander et al. | |
| 7,555,896 B2 | 7/2009 | Lewis et al. | |
| 7,577,511 B1 | 8/2009 | Tripathi et al. | |
| 7,581,531 B2 | 9/2009 | Schulz | |
| 7,614,384 B2 | 11/2009 | Livshiz et al. | |
| 7,620,188 B2 | 11/2009 | Inoue et al. | |
| 7,621,262 B2 | 11/2009 | Zubeck | |
| 7,634,349 B2 | 12/2009 | Senft et al. | |
| 7,685,976 B2 | 3/2010 | Marriott | |
| 7,785,230 B2 | 8/2010 | Gibson et al. | |
| 7,836,866 B2 | 11/2010 | Luken et al. | |
| 7,849,835 B2 | 12/2010 | Tripathi et al. | |
| 7,886,715 B2 | 2/2011 | Tripathi et al. | |
| 7,930,087 B2 | 4/2011 | Gibson et al. | |
| 7,946,263 B2 | 5/2011 | O'Neill et al. | |
| 7,954,474 B2 | 6/2011 | Tripathi et al. | |
| 8,050,841 B2 | 11/2011 | Costin et al. | |
| 8,099,224 B2 | 1/2012 | Tripathi et al. | |
| 8,108,132 B2 | 1/2012 | Reinke | |
| 8,131,445 B2 | 3/2012 | Tripathi et al. | |
| 8,131,447 B2 | 3/2012 | Tripathi et al. | |
| 8,135,410 B2 | 3/2012 | Forte | |
| 8,145,410 B2 | 3/2012 | Berger et al. | |
| 8,146,565 B2 | 4/2012 | Leone et al. | |
| 8,272,367 B2 | 9/2012 | Shikama et al. | |
| 8,347,856 B2 | 1/2013 | Leone et al. | |

(56) References Cited

U.S. PATENT DOCUMENTS

| | | |
|---|---|---|
| 8,402,942 B2 | 3/2013 | Tripathi et al. |
| 8,473,179 B2 | 6/2013 | Whitney et al. |
| 8,616,181 B2 | 12/2013 | Sahandiesfanjani et al. |
| 8,646,430 B2 | 2/2014 | Kinoshita |
| 8,646,435 B2 | 2/2014 | Dibble et al. |
| 8,701,628 B2 | 4/2014 | Tripathi et al. |
| 8,706,383 B2 | 4/2014 | Sauve et al. |
| 8,833,058 B2 | 9/2014 | Ervin et al. |
| 8,833,345 B2 | 9/2014 | Pochner et al. |
| 8,869,773 B2 | 10/2014 | Tripathi et al. |
| 8,979,708 B2 | 3/2015 | Burtch |
| 9,020,735 B2 | 4/2015 | Tripathi et al. |
| 9,140,622 B2 | 9/2015 | Beikmann |
| 9,200,575 B2 | 12/2015 | Shost |
| 9,212,610 B2 | 12/2015 | Chen et al. |
| 9,222,427 B2 | 12/2015 | Matthews et al. |
| 2001/0007964 A1 | 7/2001 | Poljansek et al. |
| 2002/0038654 A1 | 4/2002 | Sasaki et al. |
| 2002/0039950 A1* | 4/2002 | Graf ................ B60K 6/485 477/107 |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0116130 A1 | 6/2003 | Kisaka et al. |
| 2003/0123467 A1 | 7/2003 | Du et al. |
| 2003/0131820 A1 | 7/2003 | Mckay et al. |
| 2003/0172900 A1* | 9/2003 | Boyer ................ F01L 1/34 123/198 F |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |
| 2004/0138027 A1 | 7/2004 | Rustige et al. |
| 2004/0206072 A1* | 10/2004 | Surnilla ................ F01N 3/0814 60/285 |
| 2004/0258251 A1 | 12/2004 | Inoue et al. |
| 2005/0016492 A1 | 1/2005 | Matthews |
| 2005/0056250 A1 | 3/2005 | Stroh |
| 2005/0098156 A1* | 5/2005 | Ohtani ................ F02D 41/3094 123/431 |
| 2005/0131618 A1* | 6/2005 | Megli ................ F02D 13/0215 701/101 |
| 2005/0197761 A1* | 9/2005 | Bidner ................ F02P 5/045 701/105 |
| 2005/0199220 A1 | 9/2005 | Ogiso |
| 2005/0204726 A1* | 9/2005 | Lewis ................ F02D 13/06 60/285 |
| 2005/0204727 A1* | 9/2005 | Lewis ................ F01L 9/04 60/285 |
| 2005/0205028 A1* | 9/2005 | Lewis ................ F02D 13/06 123/90.11 |
| 2005/0205045 A1* | 9/2005 | Michelini ................ F02D 13/06 123/198 F |
| 2005/0205060 A1* | 9/2005 | Michelini ................ F01L 1/36 123/432 |
| 2005/0205063 A1* | 9/2005 | Kolmanovsky ........... F01L 9/04 123/436 |
| 2005/0205069 A1* | 9/2005 | Lewis ................ F01L 1/38 123/491 |
| 2005/0205074 A1* | 9/2005 | Gibson ............... F02D 13/0207 123/673 |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1* | 6/2006 | Bolander ................ F02D 13/06 123/481 |
| 2006/0178802 A1 | 8/2006 | Bolander et al. |
| 2007/0012040 A1 | 1/2007 | Nitzke et al. |
| 2007/0042861 A1* | 2/2007 | Takaoka ................ B60K 6/365 477/3 |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0234982 A1* | 10/2007 | Kolmanovsky ........... F01L 9/04 123/90.11 |
| 2007/0234984 A1* | 10/2007 | Kolmanovsky ........... F01L 9/04 123/90.15 |
| 2007/0235005 A1* | 10/2007 | Lewis ................ F01L 9/04 123/322 |
| 2008/0000149 A1 | 1/2008 | Aradi |
| 2008/0041327 A1 | 2/2008 | Lewis et al. |
| 2008/0066699 A1* | 3/2008 | Michelini ........... F02D 13/0253 123/90.11 |
| 2008/0098969 A1* | 5/2008 | Reed .................... F02D 13/0215 123/64 |
| 2008/0109151 A1 | 5/2008 | Jaros et al. |
| 2008/0121211 A1 | 5/2008 | Livshiz et al. |
| 2008/0154468 A1* | 6/2008 | Berger ................ B60K 6/365 701/54 |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1* | 1/2009 | Winstead ............... F02M 26/43 60/278 |
| 2009/0013668 A1* | 1/2009 | Winstead ............... F02M 26/43 60/278 |
| 2009/0013669 A1* | 1/2009 | Winstead ............... F02M 26/43 60/278 |
| 2009/0013969 A1* | 1/2009 | Winstead ............ F02D 13/0207 123/481 |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118965 A1 | 5/2009 | Livshiz et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0229562 A1 | 9/2009 | Ramappan et al. |
| 2009/0241872 A1 | 10/2009 | Wang et al. |
| 2009/0248277 A1* | 10/2009 | Shinagawa ......... F02D 13/0238 701/103 |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1* | 1/2010 | Leone ................ F02D 41/0087 123/192.1 |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0057283 A1 | 3/2010 | Worthing et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0192925 A1 | 8/2010 | Sadakane |
| 2010/0211299 A1* | 8/2010 | Lewis ................ F01L 1/38 701/113 |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0118955 A1 | 5/2011 | Livshiz et al. |
| 2011/0144883 A1 | 6/2011 | Rollinger et al. |
| 2011/0178693 A1 | 7/2011 | Chang et al. |
| 2011/0208405 A1 | 8/2011 | Tripathi et al. |

(56) References Cited

U.S. PATENT DOCUMENTS

| | | |
|---|---|---|
| 2011/0213526 A1 | 9/2011 | Giles et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1 | 3/2012 | Tobergte et al. |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1* | 8/2015 | Nakamura .......... F02D 13/0211 123/90.16 |
| 2015/0260112 A1 | 9/2015 | Liu et al. |
| 2015/0260117 A1 | 9/2015 | Shost et al. |
| 2015/0354470 A1 | 12/2015 | Li et al. |
| 2015/0361907 A1 | 12/2015 | Hayman et al. |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352 A | 8/2011 |

OTHER PUBLICATIONS

U.S. Appl. No. 13/798,518, filed Mar. 13, 2013, Beikmann.
U.S. Appl. No. 13/799,116, filed Mar. 13, 2013, Brennan.
U.S. Appl. No. 61/952,737, filed Mar. 13, 2014, Shost et al.
U.S. Appl. No. 14/734,619, filed Jun. 9, 2015, Matthews.
International Search Report and Written Opinion dated Jun. 17, 2015 corresponding to International Application No. PCT/US2015/019496, 14 pages.
U.S. Appl. No. 13/798,351, filed Mar. 13, 2013, Rayl.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,129, filed Mar. 13, 2013, Beikmann.
U.S. Appl. No. 13/799,181, filed Mar. 13, 2013, Beikmann.
U.S. Appl. No. 14/143,267, filed Dec. 30, 2013, Gehringer et al.
U.S. Appl. No. 14/211,389, filed Mar. 14, 2014, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.
U.S. Appl. No. 14/548,501, filed Nov. 20, 2014, Beikmann et al.
U.S. Appl. No. 14/638,908, filed Mar. 4, 2015, Shost et al.
U.S. Appl. No. 14/231,807, filed Apr. 1, 2014, Lucido et al.
U.S. Appl. No. 14/242,001, filed Apr. 1, 2014, Shibata et al.
U.S. Appl. No. 14/242,058, filed Apr. 1, 2014, Shibata et al.
U.S. Appl. No. 14/242,247, filed Apr. 1, 2014, Shibata et al.
Glossary of Judicial Claim Constructions in the Electronics, Computer and Business Method Arts. Public Patent Foundation. (2010).

* cited by examiner

SYSTEM AND METHOD FOR CONTROLLING SPARK TIMING WHEN CYLINDERS OF AN ENGINE ARE DEACTIVATED TO REDUCE NOISE AND VIBRATION

CROSS-REFERENCE TO RELATED APPLICATIONS

This application claims the benefit of U.S. Provisional Application No. 61/693,039, filed on Aug. 24, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/798,518 filed on Mar. 13, 2013, Ser. No. 13/799,129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to systems and methods for controlling spark timing when cylinders of the engine are deactivated to reduce noise and vibration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Under some circumstances, one or more cylinders of an engine may be deactivated to decrease fuel consumption. For example, one or more cylinders may be deactivated when the engine can produce a requested amount of torque while the one or more cylinders are deactivated. Deactivation of a cylinder may include disabling opening intake and exhaust valves of the cylinder and disabling fueling of the cylinder.

SUMMARY

A system according to the principles of the present disclosure includes a cylinder activation module and a spark timing module. The cylinder activation module selectively deactivates and reactivates a cylinder of an engine based on a driver torque request. When the cylinder is deactivated, the spark timing module selectively increases an amount by which spark timing of at least one active cylinder of the engine is retarded based on noise and vibration generated by the engine when the cylinder is deactivated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Engine vibration is transmitted to a driver through powertrain mounts, a vehicle body, and driver interface components such as a driver seat, a steering wheel, and pedals. Engine vibration, and vehicle body vibration resulting from engine vibration, generates noise that is sensed by the driver. When one or more cylinders of an engine are deactivated, torque pulses of cylinders that remain active may approach a resonant frequency of the vehicle structure from the powertrain mounts to the driver interface components. Thus, the driver may perceive an increase in vehicle noise and vibration.

A system and method according to the principles of the present disclosure adjusts the spark timing of one or more cylinders to reduce vehicle noise and vibration when one or more cylinders of an engine are deactivated. The spark timing of the one or more cylinders is adjusted to create a phase shift that offsets a base frequency of the other cylinders in the engine. As a result, the magnitude of vibrations perceived by the driver may be reduced, or alternatively may be masked through a white noise effect.

In one example, spark timing is retarded in less than all of the active cylinders. In another example, spark timing is retarded in all of the active cylinders and one or more additional cylinders are activated to offset a torque reduction caused by retarding the spark timing. The additional cylinders may only be temporarily activated as needed to offset the torque reduction.

Figure 1:
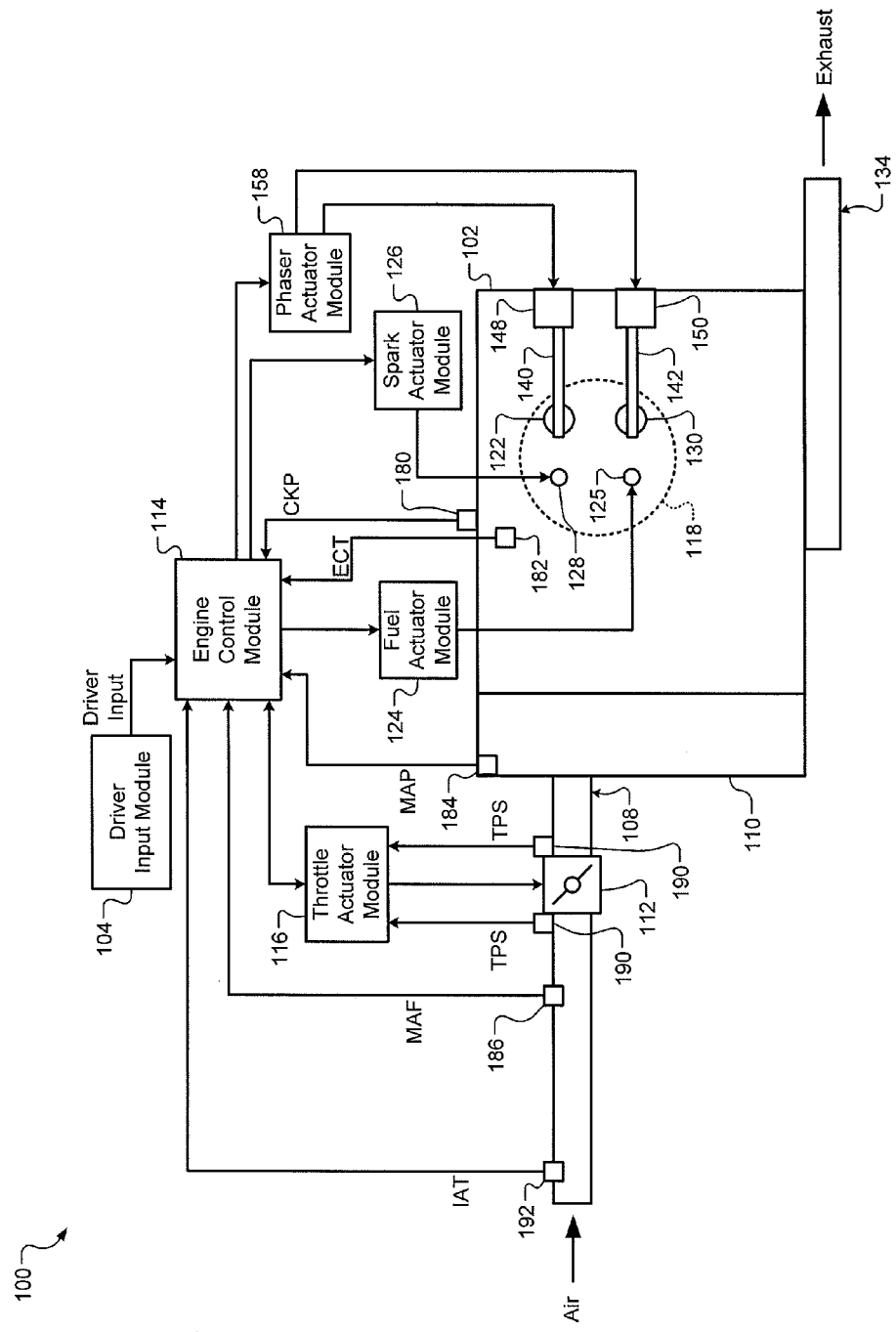
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on driver input from a driver input module 104. Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. For illustration purposes, a single representative cylinder 118 is shown. However, the engine 102 may include multiple cylinders. For example, the engine 102 may include 2, 3, 4, 5, 6, 8, 10, and/or 12 cylinders. The ECM 114 may deactivate one or more of the cylinders, which may improve fuel economy under certain engine operating conditions.

The engine 102 may operate using a four-stroke cycle. The four strokes include an intake stroke, a compression stroke, a combustion stroke, and an exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 125 to control the amount of fuel provided to the cylinder to achieve a desired air/fuel ratio. The fuel injector 125 may inject fuel directly into the cylinder 118 or into a mixing chamber associated with the cylinder 118. The fuel actuator module 124 may halt fuel injection into cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114. The spark ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. As the combustion of the air/fuel mixture drives the piston down, the piston moves from TDC to its bottommost position, referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

When the ECM 114 deactivates one or more cylinders of the engine 102, the ECM 114 adjusts (e.g., retards) the spark timing of the active cylinders to reduce vehicle noise and vibration. The ECM 114 adjusts the spark timing of the active cylinders to create a phase shift that offsets a base frequency of the other cylinders in the engine 102. As a result, the magnitude of vibrations perceived by the driver may be reduced, or alternatively may be masked through a white noise effect.

Figure 2:
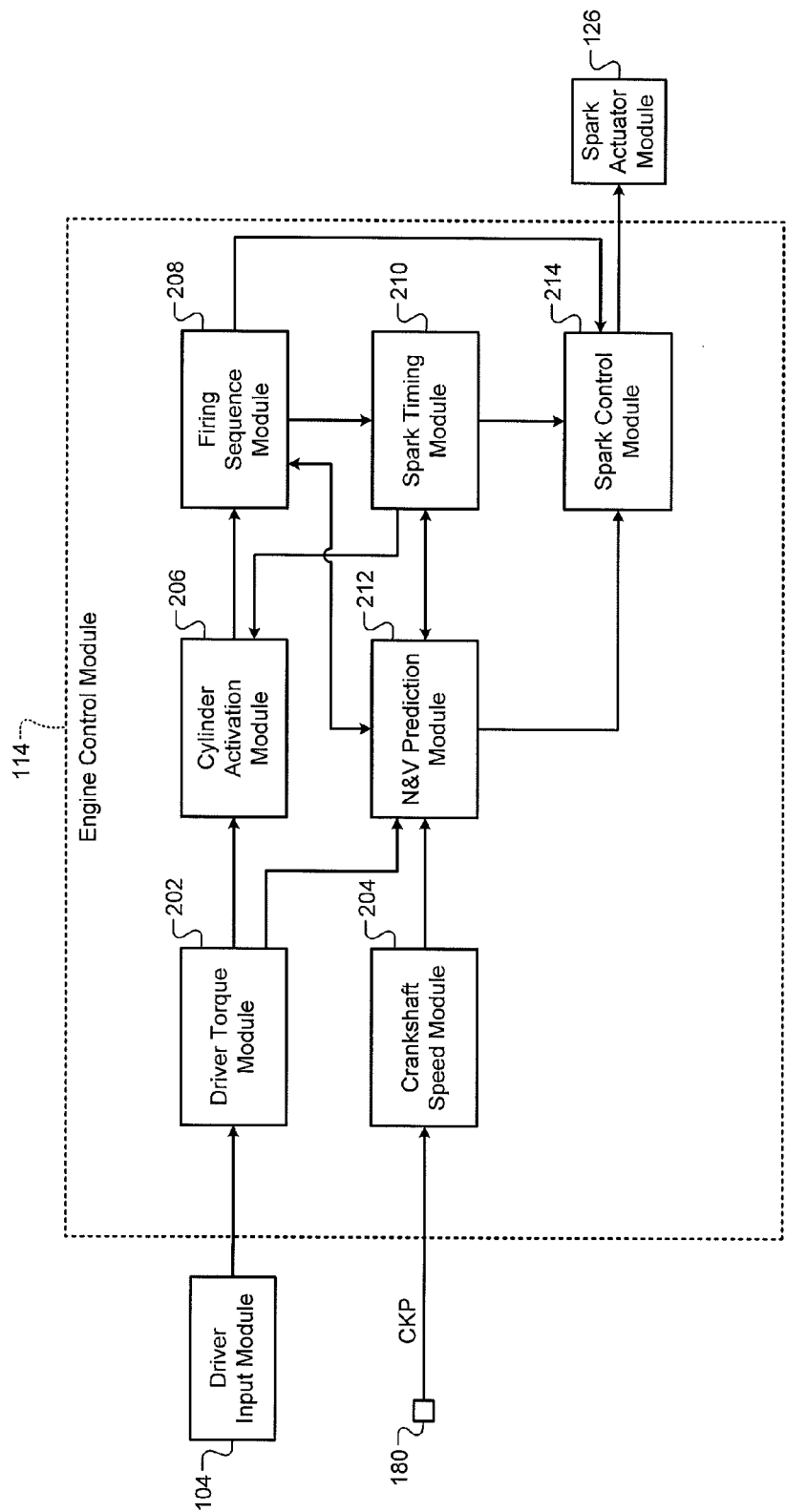
FIGS. 2 and 3 are functional block diagrams of an example control system according to the principles of the present disclosure.

Referring now to FIG. 2, an example implementation of the ECM 114 includes a driver torque module 202, a crankshaft speed module 204, and a cylinder activation module 206. The driver torque module 202 determines a driver torque request based on the driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings. The driver torque module 202 outputs the driver torque request.

The crankshaft speed module 204 determines the speed of the crankshaft. The crankshaft speed module 204 may determine the crankshaft speed based on input received from the CKP sensor 180. The crankshaft speed module 204 may determine the crankshaft speed based on an amount of crankshaft rotation between tooth detections and the corresponding period. The crankshaft speed module 204 outputs the crankshaft speed.

The cylinder activation module 206 determines a quantity of cylinders of the engine 102 to deactivate or reactivate based on the driver torque request. The cylinder activation module 206 may command deactivation of a quantity of cylinders when the engine 102 can satisfy the driver torque request while the cylinders are deactivated. The cylinder activation module 206 may command reactivation of a quantity of cylinders when the engine 102 cannot satisfy the driver torque request while the cylinders are deactivated. The cylinder activation module 206 outputs the quantity of cylinders to be deactivated or reactivated.

A firing sequence module 208 determines a firing sequence of the cylinders in the engine 102. The firing sequence module 208 may assess and/or adjust the firing sequence after each engine cycle. Alternatively, the firing sequence module 208 may assess and/or adjust the firing sequence before each firing event in the engine 102. The engine 102 completes an engine cycle as spark is generated in each cylinder in the firing sequence. Thus, an engine cycle may correspond to 720 degrees of crankshaft rotation. The firing sequence module 208 outputs the firing sequence.

The firing sequence module 208 may change the firing sequence from one engine cycle to the next engine cycle to change the quantity of active cylinders without changing the order in which cylinders are firing. For example, for an 8-cylinder engine having a firing order of 1-8-7-2-6-5-4-3, a firing sequence of 1-8-7-2-5-3 may be specified for one engine cycle, and a firing sequence of 1-7-2-5-3 may be specified for the next engine cycle. This decreases the quantity of active cylinders from 6 to 5.

Alternatively, the firing sequence module 208 may change the firing sequence from one engine cycle to the next engine cycle to change which cylinders are firing, and thereby change which cylinders are active, without changing the quantity of active cylinders. For example, when three cylinders of the 8-cylinder engine described above are deactivated, a firing sequence of 1-7-2-5-3 may be specified for one engine cycle, and a firing sequence of 8-2-6-4-3 may be specified for the next engine cycle. This deactivates cylinders 1, 7, and 5 and reactivates cylinders 8, 6, and 4. Adjusting the quantity of active cylinders and/or adjusting which cylinders are active reduces the magnitude of engine vibrations, or alternatively masks the engine vibrations through a white noise effect.

A spark timing module 210 determines the spark timing of the active cylinders in the engine 102. The spark timing module 210 may specify the spark timing in terms of a number of degrees of crankshaft rotation before a piston in a cylinder reaches TDC. The spark timing module 210 may vary the spark timing relative to TDC by the same amount for all of the active cylinders. Alternatively, the spark timing module 210 may vary the spark timing relative to TDC by a different amount for one or more of the active cylinders. The spark timing module 210 may assess and/or adjust the spark timing of the active cylinders after each engine cycle. Alternatively, the spark timing module 210 may assess and/or adjust the spark timing before each firing event in the engine 102.

Initially, the spark timing module 210 may retard the spark timing of each active cylinder by a predetermined amount (e.g., 1 or 2 degrees) relative to a spark timing that yields a maximum brake torque and thereby maximizes fuel economy. Retarding the spark timing by the predetermined amount reduces emissions such as carbon monoxide. The spark timing module 210 may then retard the spark timing of one or more of the active cylinders by an additional amount to create a phase shift that cancels a base frequency resulting from the spark timing of the other active cylinders. For example, the spark timing module 210 may retard the spark timing of every third cylinder in the firing sequence relative to the other active cylinders by an amount that is between 1 and 10 degrees.

Alternatively, the spark timing module 210 may retard the spark timing of all of the active cylinders by an additional amount, and the cylinder activation module 206 may activate one or more additional cylinders to compensate for the resulting torque reduction. The cylinder activation module 206 may only temporarily activate the additional cylinders to minimize a reduction in fuel economy caused by activating additional cylinders. For example, the cylinder activation module 206 may alternate the number of active cylinders between 5 cylinders during one engine cycle and 6 cylinders during another engine cycle, resulting in an effective cylinder count of 5.5.

A noise and vibration (N&V) prediction module 212 predicts the magnitude and/or frequency of noise and vibration generated by the engine 102 based on the firing sequence and the spark timing. The N&V prediction module 212 may predict the noise and vibration based on a predetermined relationship between the firing sequence, the spark timing, and the noise and vibration. The predetermined relationship may be developed through laboratory testing and may be embodied in an equation and/or a lookup table. The N&V prediction module 212 outputs the predicted noise and vibration.

In various implementations, the predetermined relationship may be embodied as a transfer function of the relationship between an input frequency at powertrain mounts and an output frequency at a driver interface component such as a driver seat, a steering wheel, or a pedal. The transfer function may be developed by inputting a known frequency at the powertrain mounts using, for example a shaker table, and measuring the output frequency at the driver interface component using, for example, an accelerometer. Thus, the transfer function may model the frequency response of the structure between the powertrain mounts and the driver interface component.

The firing sequence module 208 and the spark timing module 210 adjust the firing sequence and the spark timing, respectively, based on the predicted noise and vibration. The firing sequence module 208 and the spark timing module 210 may optimize the firing sequence and the spark timing, respectively, to maximize fuel economy while ensuring that the predicted noise and vibration satisfies predetermined criteria. The firing sequence module 208 and the spark timing module 210 output the firing sequence and the spark timing, as optimized, to a spark control module 214.

The spark control module 214 instructs the spark actuator module 126 to generate spark in cylinders of the engine 102 according to the firing sequence and the spark timing. The spark control module 214 may output a signal indicating which of the cylinders is next in the firing sequence. The spark control module 214 may also output a signal indicating the spark timing for the next cylinder in the firing sequence.

The ECM 114 may execute several iterations of determining a firing sequence, determining spark timing, and predicting noise and vibration based on the firing sequence and the spark timing before sending instructions to the spark actuator module 126. The firing sequence module 208 and the spark timing module 210 may be incorporated in the N&V prediction module 212, in which case the N&V prediction module 212 may output the firing sequence and the spark timing to the spark control module 214.

Figure 3:
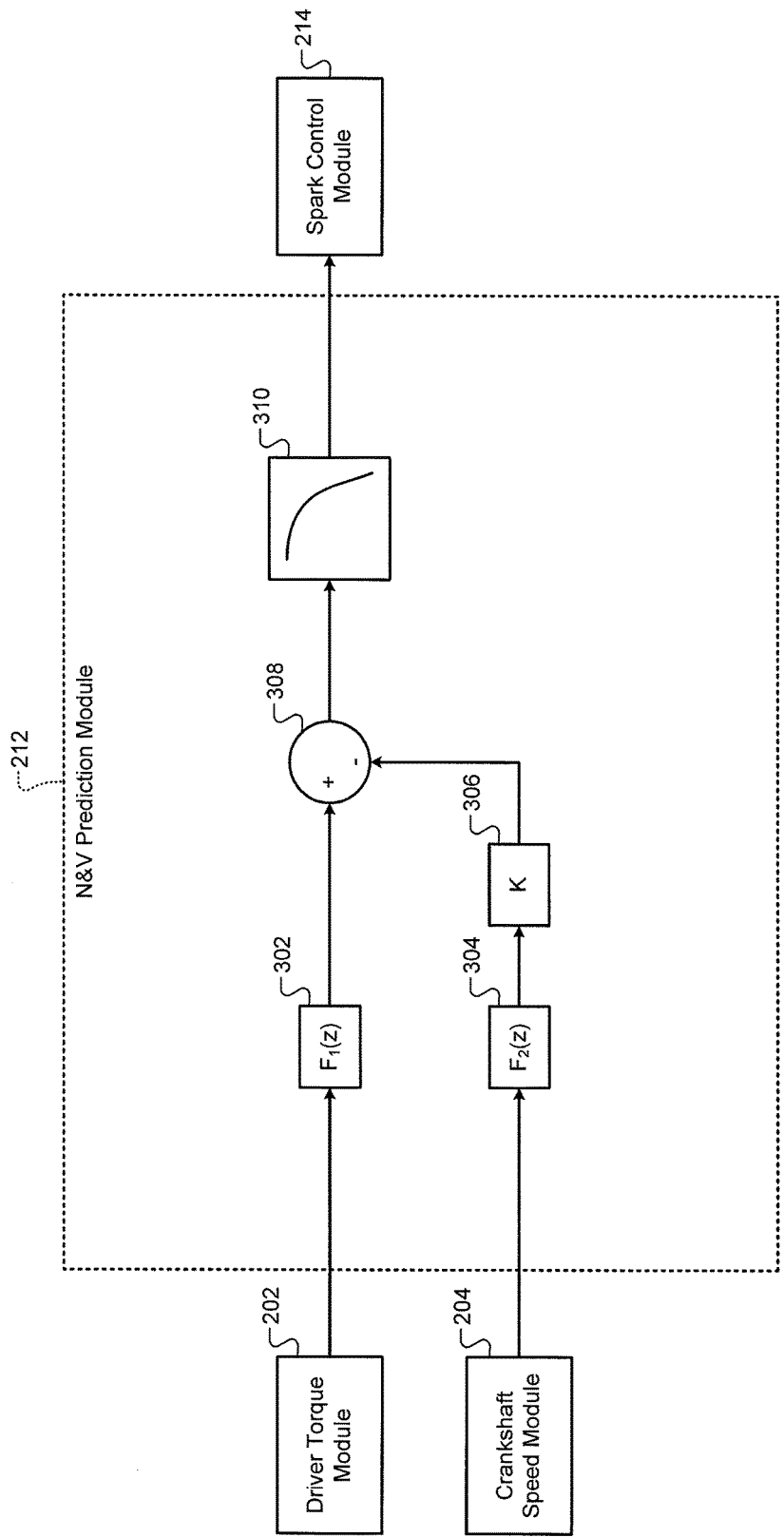

Referring now to FIG. 3, an example implementation of the N&V prediction module 212 is shown. The N&V prediction module 212 may adjust the spark timing of one or more cylinders to oppose torque excitation in a specific frequency range that may excite a driveline without opposing transient torque requests or steady state torque requests. The N&V prediction module 212 accomplishes this by applying a band-pass filter to discrete time samples of feedforward data (e.g., torque requests) and feedback data (e.g., crankshaft speed) and determining a spark torque request based on the filtered data. The band-pass filter removes input frequencies corresponding to the steady-state torque requests (e.g., frequencies less than 2 hertz) and input frequencies corresponding to the transient torque requests (e.g., frequencies greater than 50 hertz). Transient torque requests may be generated at wide-open throttle. Steady-state torque requests may be generated while cruising and/or traveling up or down a slight grade.

The example implementation of the N&V prediction module 212 includes a first band-pass filter 302, a second band-pass filter 304, a multiplier 306, an operator 308, and a mapping 310 of an input torque to an output torque. The first band-pass filter 302 receives discrete-time samples of the driver torque request from the driver torque module 202. The first band-pass filter 302 may receive discrete-time samples of other types of torque requests such as a transmission torque request generated, for example, to facilitate a transmission shift.

The second band-pass filter 304 receives discrete-time samples of the crankshaft speed from the crankshaft speed module 204. Additionally or alternatively, the second band-pass filter 304 may receive discrete-time samples of other feedback data such as transmission output shaft speed and/or accelerometer measurement data. The accelerometer measurement data may be received from an accelerometer located at a powertrain mount and/or an accelerometer located at a driver interface component such as a driver seat, a steering wheel, or a pedal.

The band-pass filters 302, 304 filter the discrete-time samples at a predetermined frequency range (e.g., between 2 hertz and 50 hertz) to remove content outside of the predetermined frequency range. The filtered feedback data samples output by the second band-pass filter 304 are multiplied by the multiplier 306 to convert the feedback data samples into torque values. The torque values are then subtracted from the filtered torque request samples output by the first band-pass filter 302 to yield a torque difference that is provided to the mapping 310.

The mapping 310 determines a spark torque request based on the torque difference and a predetermined relationship between the spark torque request and the torque difference. The predetermined relationship may be embodied in an equation and/or a lookup table. The mapping 310 outputs the spark torque request to the spark control module 214, which determines spark timing based on the spark torque request. In various implementations, the mapping 310 may determine spark timing based on the torque difference and a predetermined relationship between the spark timing and the torque difference, and may output the spark timing to the spark control module 214.

Figure 4:
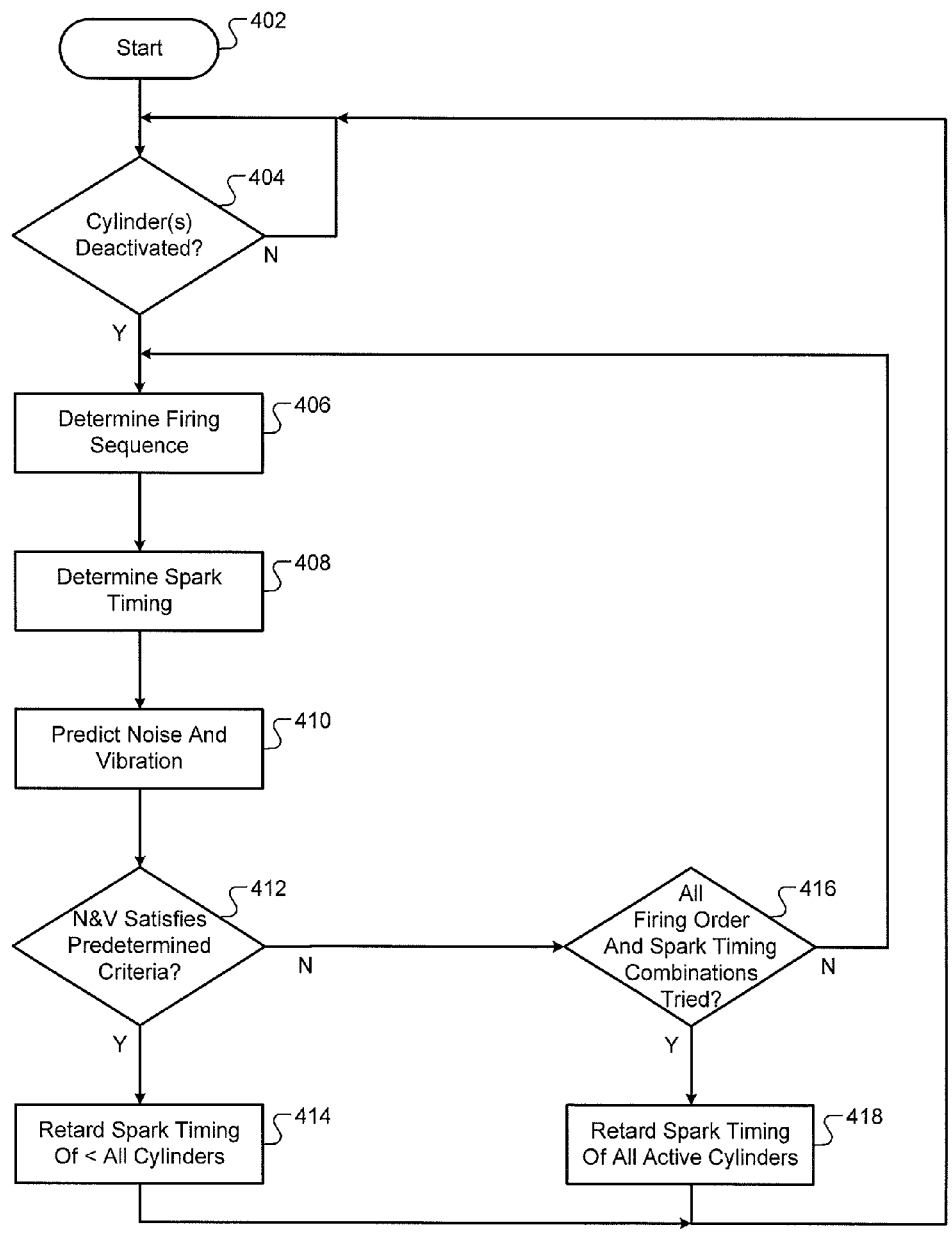
FIG. 4 is a flowchart illustrating an example control method according to the principles of the present disclosure.

Referring now to FIG. 4, a method for controlling spark timing when cylinders of an engine are deactivated begins at 402. At 404, the method determines whether one or more cylinders of the engine are deactivated. The method may deactivate one or more cylinders when the engine can satisfy a driver torque request while the cylinders are deactivated. The method may determine the driver torque request based on driver input such as an accelerator pedal position or a cruise control setting. If one or more cylinders of the engine are deactivated, the method continues at 406.

At 406, the method determines a firing sequence based on the number of cylinders that are deactivated. The method may adjust the firing sequence before each engine cycle or before each firing event. The method may change the firing sequence from one engine cycle to the next engine cycle to change the number of active cylinders without changing the order which cylinders are firing. Additionally or alternatively, the method may change the firing sequence from one engine cycle to the next engine cycle to change which cylinders are firing and thereby change which cylinders are active.

At 408, the method determines spark timing for each cylinder in the firing sequence. To reduce emissions while maximizing fuel economy, the method may initially retard the spark timing of each cylinder by a predetermined amount (e.g., 1 or 2 degrees) relative to a spark timing that yields maximum brake torque. The method may then retard the spark timing of one or more of the cylinders, but not all of the cylinders, by an additional amount to create a phase shift that cancels a base frequency resulting from the spark timing of the other cylinders in the engine. For example, the method may retard the spark timing of every third cylinder in the firing sequence relative to the other active cylinders by an amount that is between 1 and 10 degrees.

At 410, the method predicts the magnitude and/or frequency of noise and vibration generated by the engine based on the firing sequence and the spark timing. The method may predict the noise and vibration based on a predetermined relationship between the firing sequence, the spark timing, and the noise and vibration. The predetermined relationship may be embodied in an equation and/or a lookup table.

At 412, the method determines whether the noise and vibration predicted for retarding the spark timing of less than all of the cylinders by the additional amount satisfies predetermined criteria. If the noise and vibration satisfies predetermined criteria, the method continues at 414 and retards the spark timing of less than all of the cylinders by the additional amount. Otherwise, the method continues at 416.

At 416, the method determines whether the noise and vibration has been analyzed for all of the firing sequence and spark timing combinations that involve retarding spark timing by the additional amount in less than all of the active cylinders. If the noise and vibration has been analyzed for all of the firing sequence and spark timing combinations involving retarding spark timing by the additional amount in less than all of the active cylinders, the method continues at 418. Otherwise, the method continues at 406.

At 418, the method retards the spark timing of all of the active cylinders by the additional amount. The method may also activate one or more additional cylinders of the engine as needed to offset a torque reduction caused by retarding the spark timing. The method may only temporarily activate the additional cylinders to minimize a reduction in fuel economy caused by activating additional cylinders. For example, between engine cycles, the method may alternate the number of active cylinders between two integers (e.g., between 5 active cylinders and 6 active cylinders).

Figure 5:
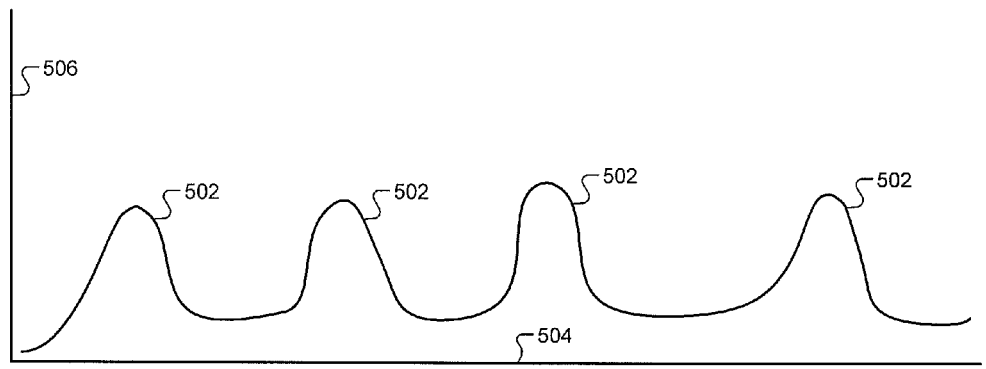
FIGS. 5 and 6 are graphs illustrating an example vehicle frequency response and example cylinder torque pulses without spark modulation.

Referring now to FIG. 5, cylinder torque pulses 502 are plotted with respect to an x-axis 504 that represents time and a y-axis 506 that represents torque. The cylinder torque pulses 502 may be calculated based on cylinder pressure measurements. To generate the cylinder torque pulses 502, spark timing relative to TDC may be varied by the same amount (e.g., 25 degrees before TDC) for all active cylinders in an engine having one or more cylinders that are deactivated. As a result, the peak values of the cylinder torque pulses 502 are approximately equal.

Figure 6:
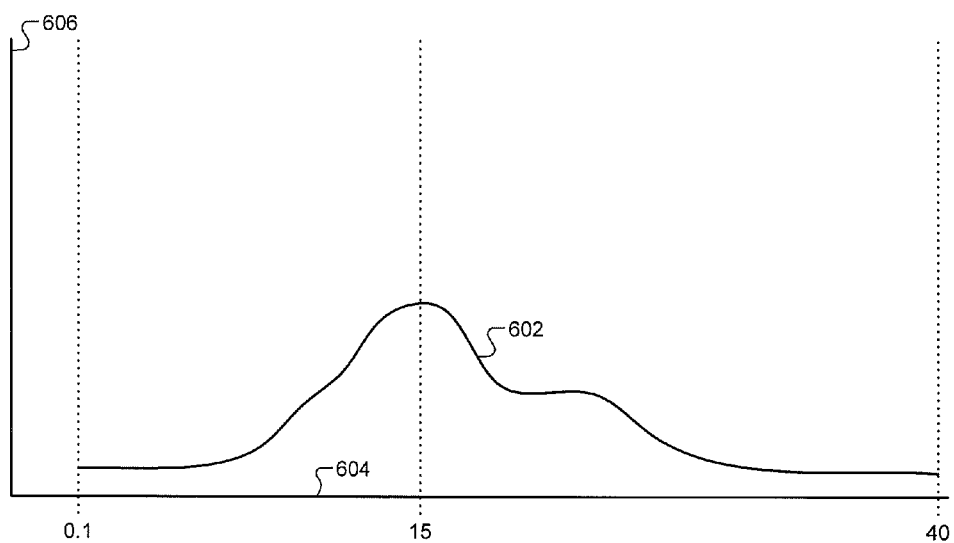

Referring now to FIG. 6, a frequency response 602 corresponding to the cylinder torque pulses 502 is plotted with respect to an x-axis 604 and a y-axis 606. The x-axis 604 represents frequency in hertz (Hz). The y-axis 606 represents the magnitude of the frequency response 602. The frequency response 602 is proportional to a ratio of an input frequency at powertrain mounts to an output frequency at a driver interface component such as a driver seat, a steering wheel, or a pedal. The input frequency may be known based on, for example, a control setting of a shaker table. Alternatively, the input frequency may be determined based on the cylinder pressure measurements. The output frequency may be measured using, for example, accelerometers mounted to the driver interface components.

As shown in FIG. 6, the magnitude of the frequency response 602 reaches a relatively high resonant frequency at approximately 15 Hz and is otherwise relatively low within the frequency range between 0.1 Hz and 40 Hz. Thus, varying the spark timing by the same amount for all active cylinders may yield a relatively high resonant frequency, which may cause noise and vibration that is perceived by a driver.

Figure 7:
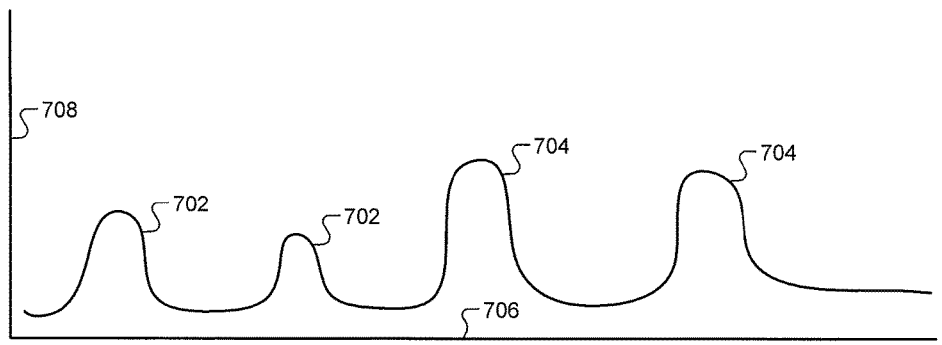
FIGS. 7 and 8 are graphs illustrating an example vehicle frequency response and example cylinder torque pulses with spark modulation.

Referring now to FIG. 7, cylinder torque pulses 702, 704 are plotted with respect to an x-axis 706 that represents time and a y-axis 708 that represents torque. The cylinder torque pulses 702, 704 may be calculated based on cylinder pressure measurements. Spark timing relative to TDC may be varied by a first amount (e.g., 25 degrees before TDC) to generate the cylinder torque pulses 704. Spark timing may be retarded by a second amount (e.g., 1 to 10 degrees) relative to the first amount to generate the cylinder torque pulses 702. As a result, the peak values of the cylinder torque pulses 702 are less than the peak values of the cylinder torque pulses 704.

Figure 8:
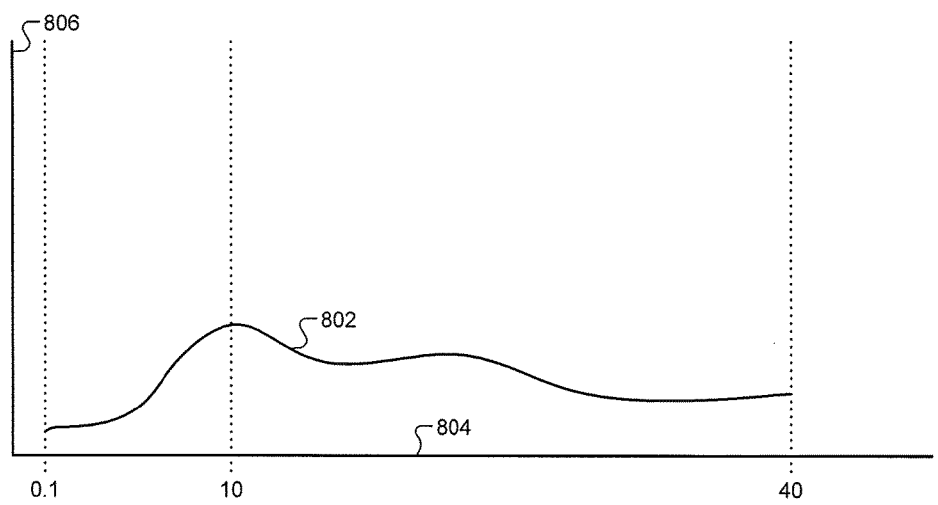

Referring now to FIG. 8, a frequency response 802 corresponding to the cylinder torque pulses 702, 704 is plotted with respect to an x-axis 804 and a y-axis 806. The x-axis 804 represents frequency in Hz. The y-axis 806 represents the magnitude of the frequency response 802. The frequency response 802 is proportional to a ratio of an input frequency at powertrain mounts to an output frequency at a driver interface component such as a driver seat, a steering wheel, or a pedal. The input frequency may be known based on, for example, a control setting of a shaker table vibrating the powertrain mounts. Alternatively, the input frequency may be determined based on the cylinder pressure measurements. The output frequency may be measured using, for example, accelerometers mounted to the driver interface components.

As shown in FIG. 8, the magnitude of the frequency response 802 is more evenly distributed in the frequency range between 0.1 and 40 Hz and reaches a relatively low peak value at approximately 10 Hz. Thus, retarding the spark timing for some active cylinders, but not all active cylinders, may yield a relatively low resonant frequency and may not cause noise and vibration that is perceived by a driver.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
   a cylinder activation module that selectively deactivates and reactivates a cylinder of an engine based on a driver torque request; and
   a spark timing module that, when the cylinder is deactivated for multiple engine cycles, selectively increases an amount of spark retard for at least one other cylinder of the engine that is active based on noise and vibration generated by the engine when the cylinder is deactivated.

2. The system of claim 1 wherein:
the spark timing module selectively increases the amount of spark retard for M of N active cylinders of the engine when the cylinder is deactivated; and
M is less than N.

3. The system of claim 1 wherein the spark timing module selectively increases the amount of spark retard for all active cylinders of the engine when the cylinder is deactivated.

4. The system of claim 3 wherein:
the cylinder activation module selectively reactivates N cylinders of the engine when the amount of spark retard for all of the active cylinders is increased; and
N is based on the driver torque request.

5. The system of claim 1 further comprising a noise and vibration (N&V) prediction module that predicts the noise and vibration generated by the engine when the cylinder is deactivated.

6. The system of claim 5 wherein the N&V prediction module predicts the noise and vibration generated by the engine based on a predetermined relationship between an input frequency at a powertrain mount and an output frequency at a driver interface component.

7. The system of claim 5 wherein the N&V prediction module predicts the noise and vibration generated by the engine based on a firing sequence of the engine and spark timing of active cylinders of the engine.

8. The system of claim 1 further comprising a firing sequence module that adjusts a firing sequence of the engine between consecutive engine cycles to change a quantity of active cylinders in the engine.

9. The system of claim 5 wherein:
the N&V prediction module applies a band-pass filter to feedforward data and feedback data associated with torque output of the engine; and
the spark timing module adjusts the spark timing of the at least one active cylinder based on the filtered data.

10. The system of claim 9 wherein:
the feedforward data includes the driver torque request; and
the feedback data includes crankshaft speed.

11. A method comprising:
selectively deactivating and reactivating a cylinder of an engine based on a driver torque request; and
when the cylinder is deactivated for multiple engine cycles, selectively increasing an amount of spark retard for at least one other cylinder of the engine that is active based on noise and vibration generated by the engine when the cylinder is deactivated.

12. The method of claim 11 further comprising selectively increasing the amount of spark retard for M of N active cylinders of the engine when the cylinder is deactivated, wherein M is less than N.

13. The method of claim 11 further comprising selectively increasing the amount of spark retard for all active cylinders of the engine when the cylinder is deactivated.

14. The method of claim 13 further comprising selectively reactivating N cylinders of the engine when the amount of spark retard for all of the active cylinders is increased, wherein N is based on the driver torque request.

15. The method of claim 11 further comprising predicting the noise and vibration generated by the engine when the cylinder is deactivated.

16. The method of claim 15 further comprising predicting the noise and vibration generated by the engine based on a predetermined relationship between an input frequency at a powertrain mount and an output frequency at a driver interface component.

17. The method of claim 15 further comprising predicting the noise and vibration generated by the engine based on a firing sequence of the engine and spark timing of active cylinders of the engine.

18. The method of claim 11 further comprising adjusting a firing sequence of the engine between consecutive engine cycles to change a quantity of active cylinders in the engine.

19. The method of claim 15 further comprising:
applying a band-pass filter to feedforward data and feedback data associated with torque output of the engine; and
adjusting the spark timing of the at least one active cylinder based on the filtered data.

20. The method of claim 19 wherein:
the feedforward data includes the driver torque request; and
the feedback data includes crankshaft speed.

* * * * *